United States Patent [19]

Frazier

[11] Patent Number: 5,032,183
[45] Date of Patent: Jul. 16, 1991

[54] METHOD OF CLEANING MEAT DRIPPINGS FROM GAS CHARCOAL BRIQUETTES

[76] Inventor: Richard E. Frazier, 320 E. Key Blvd., Midwest City, Okla. 73110

[21] Appl. No.: 596,094

[22] Filed: Oct. 10, 1990

[51] Int. Cl.$^5$ .......................... F23J 1/00; A47J 37/00
[52] U.S. Cl. ........................................ 134/5; 134/19; 126/9 R; 126/39 R; 126/41 R
[58] Field of Search ...................... 134/2, 5, 19, 25.1, 134/40; 126/41 R, 39 R, 9 R

[56] References Cited

U.S. PATENT DOCUMENTS

| | | | |
|---|---|---|---|
| 3,474,724 | 10/1969 | Jenn | 126/41 R |
| 3,638,634 | 2/1972 | Bolitho | 126/41 R |
| 4,679,543 | 7/1987 | Waltman et al. | 126/41 R |

*Primary Examiner*—Theodore Morris
*Assistant Examiner*—Saeed Chaudhry

[57] ABSTRACT

A gas grill briquette basket used to help reduce flame flare-up and unhealthy bacteria growth which can result from a build-up of grease drippings from meat onto briquettes. Briquette basket could be made of metal rods welded together forming a basket (cage) which surrounds the briquettes. After cooking session has ended and food has been removed from food rack, user removes food rack, raises briquette basket with ladles which attached to either end of briquette basket, rotates briquette basket 180 degrees around the horizontal axis with said handles and lower said basket back into position, and replaces food rack. Now the side of the briquette basket which received the meat and the grease drippings during the cooking session is facing the gas burner and the heat from the burner burns the meat and the grease drippings.

6 Claims, 3 Drawing Sheets

METHOD OF CLEANING MEAT DRIPPINGS FROM GAS CHARCOAL BRIQUETTES

BACKGROUND OF THE INVENTION

1. Field of the Invention

The field of the invention relates to outdoor charcoal gas grills, specifically to an improved method of cleaning grease from charcoal briquettes made from lava rock or other substances.

2. Discussion

Cooking food on an outdoor gas grill has long been a favorite pastime for millions of Americans. This activity not only adds a pleasant taste and aroma to the food, but it also allows family members who seldom cook in the kitchen an opportunity to display their cooking skills.

Although cooking on an outdoor gas grill can be fun, relaxing, and enjoyable; it can also be frustrating and a possible health risk. Grease which drips from the meat onto the charcoal briquettes tends to collect in the cracks, cavities, and on the outer side of the briquettes which face the meat. On future occasions when the charcoal grill is used, this grease becomes heated and tends to flare-up causing the meat to burn. Health officials are also concerned that this layer of grease on the charcoal briquettes is a breeding ground for bacteria which could be harmful to those who consume food cooked under these conditions.

Heretofore, health officials and manufactures of gas grills have suggested that between use the user should periodically remove the briquettes from the gas grill, brush each briquette with a stiff wire brush followed by soap and water. Users are further instructed to replace the briquettes into the gas grill, positioning the briquettes so that the side of the briquettes which has just been cleaned faces the gas burner (this is done so that the heat from the burner can help remove any grease which remains on the briquette).

This process is so time consuming and messy that users seldom put forth the time and effort required to perform this cleaning task. Consequently, this exposes the user to the frustration of burned meat caused by flare-ups and a possible health risk from bacteria growing in grease which has collected on the briquettes from previous use.

The present invention provides a simple, reliable, inexpensive method which will help clean the grease from gas grill briquettes, thus helping to make using a gas grill less frustrating and less of a health risk for the user.

OBJECTS AND ADVANTAGES

Accordingly, we claim the following as our objects and advantages of the invention: to provide a simple, reliable method to help clean grease from gas grill briquettes.

In addition, we claim the following objects and advantages: to provide a simple, reliable method to help reduce flare-ups during cooking, caused from grease which has collected on the briquettes from previous cooking sessions.

In addition, we claim the following objects and advantages: to provide a method of cleaning briquettes which will help reduce the health risk associated with the bacteria found in grease on briquettes from previous cooking sessions.

In addition, we further claim the following objects and advantages: to provide a method of cleaning gas grill briquettes which will make cooking on outdoor gas grills more healthy and enjoyable.

Figure 1:
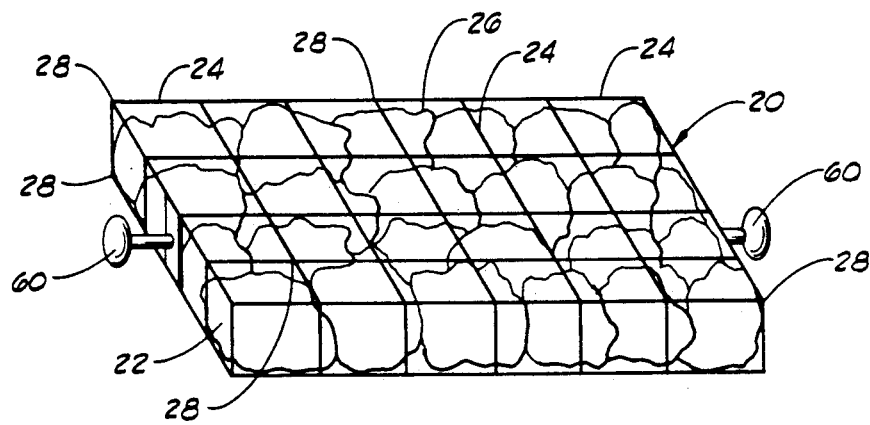
FIG. 1 shows an isometric view of the charcoal briquette basket according to the invention.

DRAWING REFERENCE NUMERALS 20 briquette basket
22 briquettes
24 metal rods on 20
26 open spaces between metal rods 20 exposing briquettes 22
28 weld where two metal rods 24 are connected
30 top portion of 20
32 back portion of 20
34 side portion of 20
36 bottom portion of 20
38 front portion of 20
40 side portion of 20
42 single briquette (lava rock)
55 gas grill with opening 62 on either end
56 briquette rack on inside of 55
57 gas grill with opening 72 on one end
58 gas burner
60 handle
62 opening in side wall of 55
64 food rack on 55
66 solid plate mounted on the end of 20
68 handle mounted on 66
briquette rack similar to briquette rack 20, but with solid plate 66 and handle 68 mounted on one end of said rack
72 opening in 57 into which 70 can be placed

DESCRIPTION OF INVENTION

FIG. 1 shows an isometric view of the charcoal briquette basket 20 containing briquette rock 22 where basket is made of ceramic material or metal covered with ceramic material. The basket is constructed by welding metal rods 24 together to form a pattern as illustrated in FIG. 1. The metal rods 24 are sufficient in diameter and strength to withstand the high temperatures which they are exposed to while inside the gas grill. All points where rods come into contact with one another 28 have been connected by welding or similar means. The open spaces 26 between the metal rods 24 are such that they are too small to allow the briquettes 22 to pass through the openings 26. Prior to attaching the last few metal rods 24 in place, a sufficient amount of briquettes 22 are placed inside the briquette basket 20. Handle 60 is attached to ends of 20.

Figure 2:
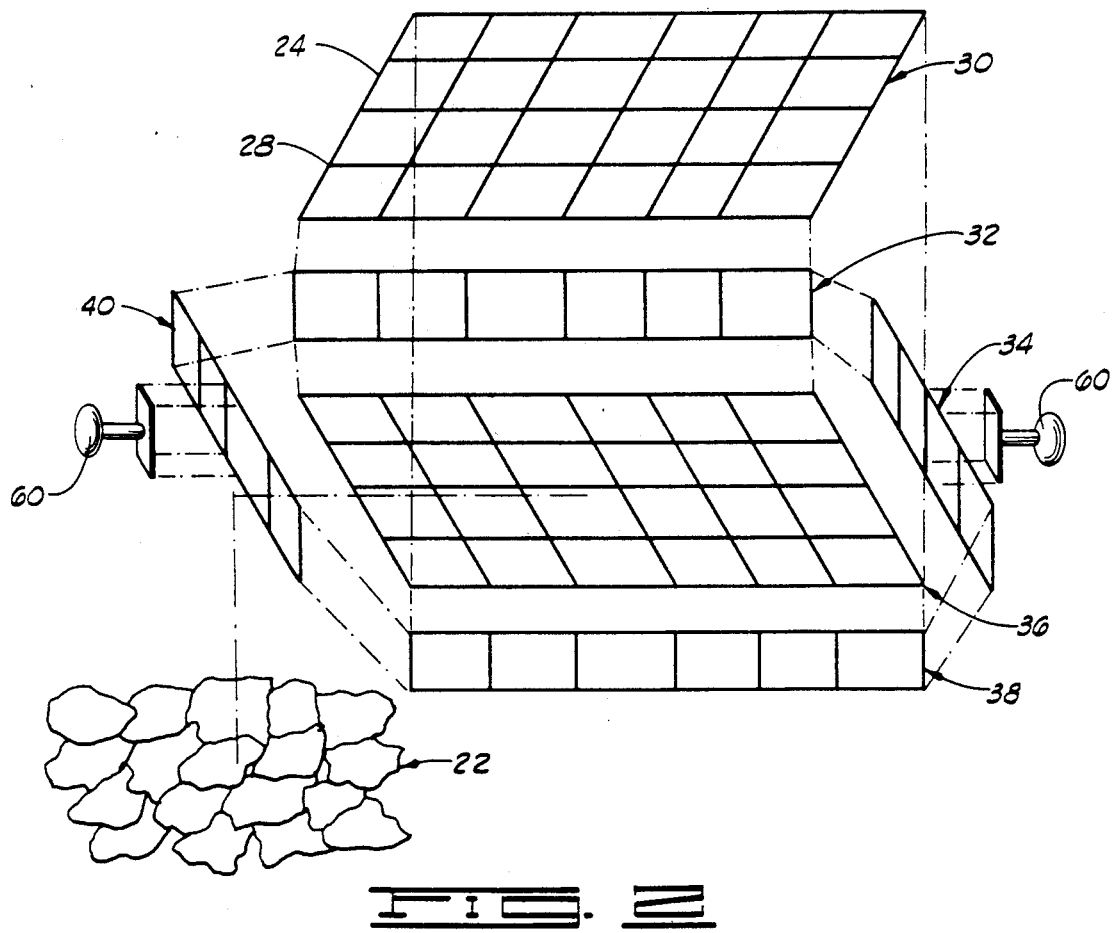
FIG. 2 shows an exploded front view of such charcoal briquette basket.

FIG. 2 shows an exploded front view of the briquette basket 20. The top portion 30 and the bottom portion 36 of the basket 20 are the same size and shape. The two side portions 34 and 40 of basket 20 are both the same size and shape. The length of side pieces 34 and 40 is approximately the same as the length of the top portion 30 and bottom portion 36 as measured from front to back. The front portion 38 and back portion 32 of basket 20 are both the same size and shape. The width of front portion 38 and back portion 32 is approximately the same as the width of top portion 30 and bottom portion 36 as measured from side to side. The height of front portion 38, back portion 32, and side portion 34 and 40 are all the same and such as is necessary to contain a sufficient amount of briquettes 22. The length and width of top portion 30, bottom portion 36, and side portions 34 and 40, front portion 38, and back portion 32 are such that they are compatible and form a box shape cage when attached together. The size and shape of briquette basket 20 would vary depending upon the size and shape of the gas grill into which it is to be installed.

Figure 3:
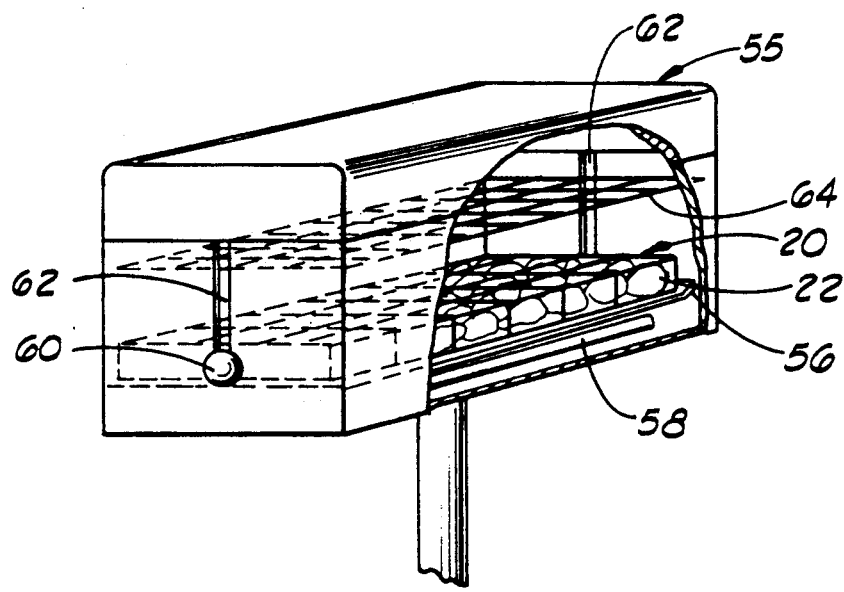
FIG. 3 shows an isomeric cut-away view of a gas grill exposing such a briquette basket containing briquettes, which has been positioned inside a gas grill.

FIG. 3 shows an isometric cut-away view of gas grill 55 exposing briquette basket 20 containing briquettes 22 which has been positioned inside of gas grill 55. Briquette basket 20 rests on top of briquette rack 56 which is normally found in gas grills for the purpose of supporting briquettes just above the gas burner 58. Because briquette basket 20 rests on briquette rack 56, said basket 20 can be made of a lighter weight material than that which would be needed if said rack 56 was not present.

Figure 4:
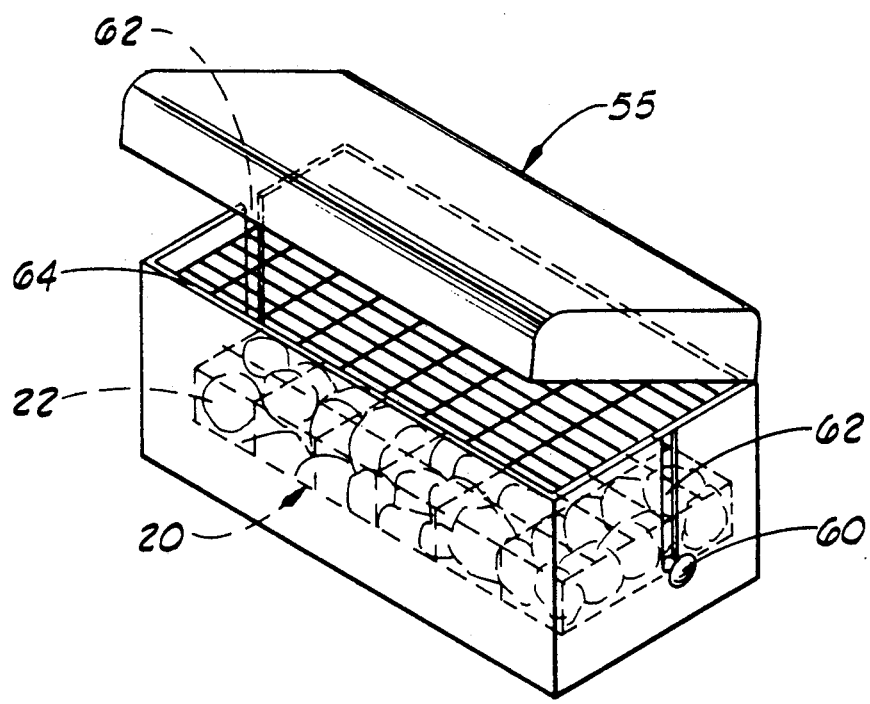
FIG. 4 shows an isometric side view of a gas grill which has an opening in the sidewall of the gas grill and a handle which is attached to the briquette basket.

FIG. 4 shows an isometric side view of a gas grill 55 which has an opening 62 in the sidewall on either end. Briquette basket 20 represented by dotted lines has a handle 60 attached to the basket at either end, with said handles 60 extending through said openings 62 in the sidewalls of said gas grill 55. Food rack 64 which is used to support the meat above the briquettes during cooking sessions can also be seen in FIG. 4.

Figure 5:
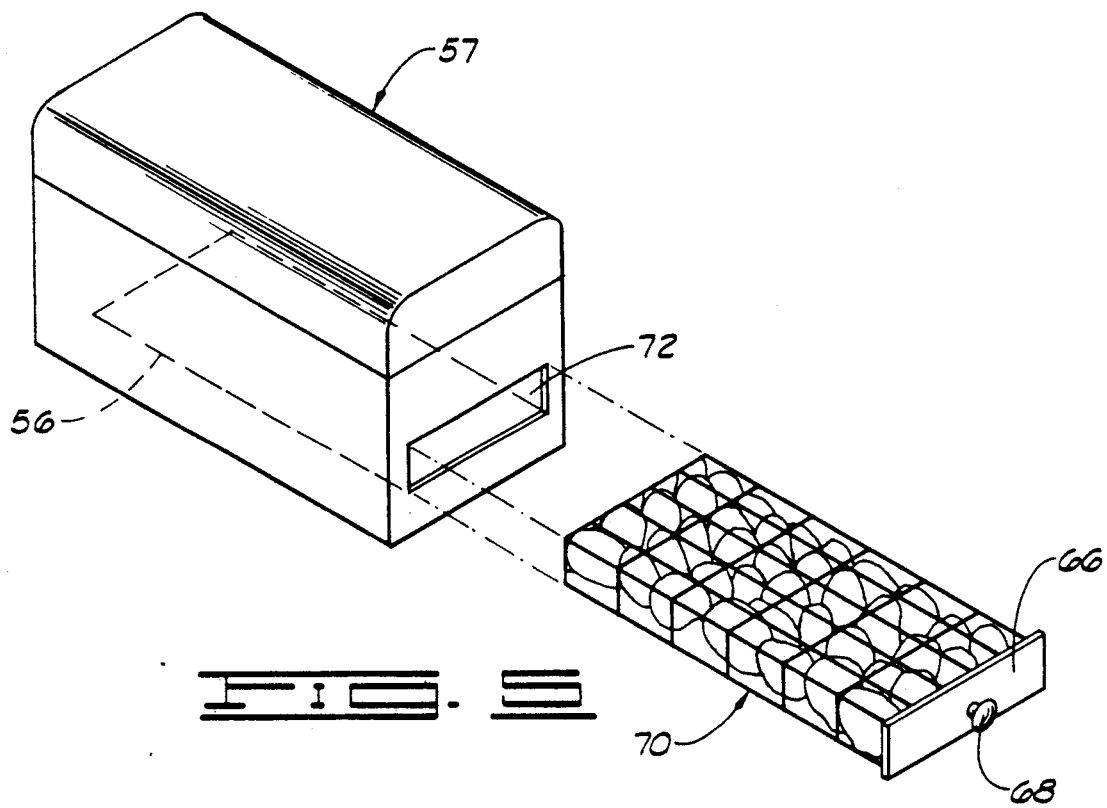
FIG. 5 shows an isometric side view of a gas grill which has a side plate and handle attached to the briquette basket.

FIG. 5 shows an isometric side view of gas grill 57, and briquette basket 70 which has attached side plate 66 and handle 68. Briquette basket 70 is similar in design and construction to briquette basket 20 as shown in FIG. 1 and FIG. 2. Gas grill 57 has opening 72 in sidewall through which basket 70 can be inserted or removed from the gas grill 57. Said basket 70 rests on briquette rack 56.

Figure 6:
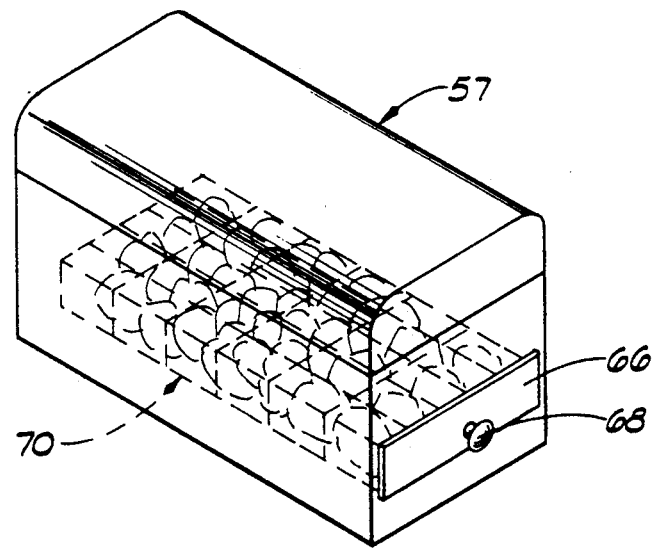
FIG. 6 shows an isometric side view of such gas grill and briquette basket referred to in FIG. 5.

FIG. 6 shows an isometric side view of gas grill 57, with solid plate 66 and handle 68 attached to briquette basket 20.

OPERATION OF THE INVENTION

FIG. 2 shows an exploded front view of briquette basket 20. Basket 20 is constructed at the factory from metal rods 24 which are attached together by welding 28 or other means. Prior to attaching the last few metal rods 24 in place, a sufficient amount of briquettes 22 are placed inside the briquette basket 20. The finished briquette basket is shown in FIG. 1. The size and shape of the briquette basket 20 is such that it will fit comfortably into gas grill 55 as shown in FIG. 3 and rest on top of briquette rack 56 which is normally found in gas grills for the purpose of supporting briquettes just above gas burner 58.

Food to be cooked is placed on food rack 64 which is shown in FIG. 3. During the cooking session, grease drippings tend to drip onto the briquettes 22 contained in briquette basket 20. After cooking session has ended and food has been removed from food rack 64, user removes food rack 64, raises handles 60 which are attached to either end of briquette basket 20, rotates briquette basket 20 180 degrees around the horizontal axis with said handles and lowers said basket back into position, and replaces food rack 64. Now the side of the briquette basket 20 which received the meat and the grease drippings during the previous cooking session is facing the gas burner 58 as shown in FIG. 3. During the next cooking session, this grease should burn off helping to eliminate a build-up of grease on the briquettes 22. This procedure would be especially helpful if performed before the cooking session ends. After cooking the food, but prior to extinguishing the flame on the gas burner 58, user removes the food and the food rack 64, turns the briquette basket 20 as just described, and permits the gas burner 58 to burn off the grease for approximately 10 minutes. This will remove the grease while it is still warm and in doing so, help eliminate harmful bacteria which tend to form in cool grease.

Another alternate design is shown in FIGS. 5 and 6. As shown in FIG. 5 gas grill 57 has an opening in sidewall the approximate size and shape of briquette rack 70. As shown in FIG. 5 side plate 66 and handle 68 are attached to briquette rack. These three pieces together are represented by reference numeral 70. During cooking sessions the sideplate 66 fits flush with the side of gas grill 57. Handle 68 allows user to remove or reinsert the briquette basket 70 through opening 72. After each cooking session, user can remove briquette basket 70, rotate basket 180 degrees around the horizontal axis with said handle and replace said basket into gas grill 57. This would allow the heat from the burner (located just below briquette rack 56 as shown in FIG. 6) to burn the meat drippings. This design would also allow the user to slide briquette basket 70 partially out of grill during cooking session to extinguish flame on briquettes should flare up occur, and then slide briquette rack back into position and continue cooking.

CONCLUSIONS, RAMIFICATIONS, AND SCOPE OF THE INVENTION

Thus, the reader will see that the charcoal briquette basket of the invention provides a simple, reliable, inexpensive method which will help clean grease from gas grill briquettes, thus helping to make using a gas grill less frustrating and less of a health risk for the user.

What is claimed is:

1. A method of cleaning meat drippings from gas charcoal briquettes, comprising:
    (a) Providing a wire basket enclosed on all six sides and containing charcoal briquettes, said basket having handles at either ends, a gas grill with opening at either ends, allowing said handles to extend through said openings,
    (b) rotating basket 180 degrees around the horizontal axis with said handles, while in a raised position
    (c) cleaning the briquettes by allowing the heat from the burner to burn meat drippings.

2. The claimed subject matter of claim 1 wherein said basket containing charcoal briquettes is made of ceramic material.

3. The claimed subject matter of claim 1 wherein said basket containing charcoal briquettes is made of metal covered with ceramic material.

4. A method of cleaning meat drippings from gas charcoal briquettes, comprising:
    (a) Providing a wire basket enclosed on all six sides and containing charcoal briquettes, said basket having a panel attached to one end with a handle attached to said panel, a gas grill with an opening at one end, allowing basket with attached end panel and handle to be inserted or removed from said gas grill through said opening:
(b) removing said basket from gas grill;
(c) rotating basket 180 degrees around horizontal axis with said handle;
(d) reinserting wire basket with attached end panel and handle into gas grill through the opening in end of said grill;
(e) cleaning the briquettes by allowing the heat from the burner to burn meat drippings.

5. The claimed subject matter of claim 4 wherein said basket containing charcoal briquettes is made of ceramic material.

6. The claimed subject matter of claim 4 wherein said basket containing charcoal briquettes is made of metal covered with ceramic material.

* * * * *